United States Patent
Liu et al.

(10) Patent No.: US 9,118,052 B2
(45) Date of Patent: Aug. 25, 2015

(54) INTEGRATED NATURAL GAS POWERED SOFC SYSTEMS

(75) Inventors: Mingfei Liu, Atlanta, GA (US); Meilin Liu, Atlanta, GA (US); Ting He, Bartlesville, OK (US)

(73) Assignees: Philips 66 Company, Houston, TX (US); Georgia Tech Research Corporation, Atlanta, GA (US)

( * ) Notice: Subject to any disclaimer, the term of this patent is extended or adjusted under 35 U.S.C. 154(b) by 177 days.

(21) Appl. No.: 13/608,913

(22) Filed: Sep. 10, 2012

(65) Prior Publication Data

US 2013/0209904 A1 Aug. 15, 2013

Related U.S. Application Data

(60) Provisional application No. 61/539,621, filed on Sep. 27, 2011.

(51) Int. Cl.
| | |
|---|---|
| *H01M 8/06* | (2006.01) |
| *H01M 8/12* | (2006.01) |
| *H01M 8/24* | (2006.01) |
| *H01M 16/00* | (2006.01) |

(52) U.S. Cl.
CPC .............. *H01M 8/0606* (2013.01); *H01M 8/12* (2013.01); *H01M 8/2495* (2013.01); *H01M 16/00* (2013.01); *H01M 8/0618* (2013.01); *H01M 8/0637* (2013.01); *H01M 2008/1293* (2013.01); *H01M 2300/0074* (2013.01); *Y02E 60/521* (2013.01); *Y02E 60/525* (2013.01)

(58) Field of Classification Search
None
See application file for complete search history.

(56) References Cited

U.S. PATENT DOCUMENTS

| 5,549,983 | A | 8/1996 | Yamanis | |
|---|---|---|---|---|
| 7,749,626 | B2 | 7/2010 | Take | |
| 2006/0204809 | A1 | 9/2006 | Horiuchi et al. | |
| 2006/0263655 | A1 | 11/2006 | Schaevitz et al. | |
| 2009/0155647 | A1* | 6/2009 | Cui et al. | 429/19 |
| 2009/0202881 | A1 | 8/2009 | Uchiyama | |
| 2010/0112408 | A1 | 5/2010 | Yang et al. | |
| 2010/0297515 | A1* | 11/2010 | Erikstrup et al. | 429/434 |

FOREIGN PATENT DOCUMENTS

WO PCT/US2012/054420 9/2012

OTHER PUBLICATIONS

Zhao et al., Fabrication and characterization of anode-supported micro-tubular solid oxide fuel cell based on BaZr0.1Ce0.7Y0.1YbO3-$ electrolyte, Journal of Power Sources 196 (2011) 688-691.*

Atkinson, et al., *Advanced anodes for high-temperature fuel cells*, Nature Materials 3 (Jan. 2004), 17-27.

(Continued)

*Primary Examiner* — Miriam Stagg
*Assistant Examiner* — Carmen Lyles-Irving
(74) *Attorney, Agent, or Firm* — Gardere Wynne Sewell LLP; Chris P. Perque; Teresa J. Lechner-Fish

(57) ABSTRACT

The present invention discloses an integrated SOFC system powered by natural gas. Specifically, a SOFC-O cell is combined with a SOFC-H cell so as to take advantage of the high operating temperature and steam reforming capabilities of the SOFC-O cell as well as the higher fuel conversion efficiency of the SOFC-H cell.

20 Claims, 3 Drawing Sheets

(56) References Cited

OTHER PUBLICATIONS

Demin, et al., *Thermodynamic analysis of a methane fed SOFC system based on a protonic conductor*, Solid State Ionics 152-153 (2002), 555-560.

De Souza, et al., *Thin-film solid oxide fuel cell with high performance at low-temperature*, Solid State Ionics 98(1,2) (1997), 57-61.

Jiang, et al., *Novel structured mixed ionic and electronic conducting cathodes of solid oxide fuel cells*, Solid State Ionics 176 (2005), 1351-1357.

Kim, et al., *Effects of chrome contamination on the performance of $La_{0.6}Sr_{0.4}Co_{0.2}Fe_{0.8}O_3$ cathode used in solid oxide fuel cells*, Journal of the Electrochemical Society 153(5) (2006), A880-A886.

Liu, et al., *Rational SOFC material design: new advances and tools*, Materials Today 14(11) (Nov. 2011), 534-546.

Park, et al., *Direct oxidation of hydrocarbons in a solid-oxide fuel cell*, Nature 404(6775) (Mar. 16, 2000), 265-267.

Singhal, *Advances in solid oxide fuel cell technology*, Solid State Ionics 135 (2000), 305-313.

Steele, *Fuel-cell technology: running on natural gas*, Nature 400 (Aug. 12, 1999), 619-621.

Steele, et al., *Materials for fuel-cell technologies*, Nature 414(6861) (Nov. 15, 2001), 345-352.

Xia, et al., $Sm_{0.5}Sr_{0.5}CoO_3$ *cathodes for low-temperature SOFCs*, Solid State Ionics 149 (2002), 11-19.

Yang, et al., *Enhanced sulfur and coking tolerance of a mixed ion conductor for SOFCs: $BaZr_{0.1}Ce_{0.7}Y_{0.2-x}Yb_xO_{3-\delta}$*, Science 326 (Oct. 2, 2009), 126-129.

\* cited by examiner

INTEGRATED NATURAL GAS POWERED SOFC SYSTEMS

PRIOR RELATED APPLICATIONS

This application claims priority to 61/539,621, filed Sep. 27, 2011, and expressly incorporated by reference herein.

FIELD OF THE INVENTION

The invention relates to an integrated natural gas powered solid oxide fuel cell system for generating electricity, and more particularly to an integrated natural gas powered solid oxide fuel cell system in which SOFC-O cells are combined with SOFC-H cells in such a way as to efficiently use lightweight hydrocarbons, e.g., methane, as a fuel source for producing electricity.

BACKGROUND OF THE INVENTION

The demand for clean, secure, and renewable energy has stimulated great interest in fuel cells. A fuel cell is a device that converts chemical energy from a fuel into electricity through electrochemical reactions involving oxygen or another oxidizing agent. Fuel cells are different from batteries in that they require a constant source of fuel and oxygen to run, but they can produce electricity continually, so long as these inputs are supplied.

There are many types of fuel cells, but they all consist of an anode (negative side), a cathode (positive side) and an electrolyte that allows charges to move between the two sides of the fuel cell. Electrons are drawn from the anode to the cathode through an external circuit, producing direct current electricity. The main difference between the various types of fuel cells is the electrolyte. Thus, fuel cells are classified by the type of electrolyte they use. There are many different types of fuel cells, including molten carbonate fuel cells (MCFC), phosphoric acid fuel cells (PAFC), alkaline fuel cells (AFC), polymer electrolyte membrane fuel cells (PEMFC), and many more.

Solid Oxide Fuel Cells (SOFCs) are a particular type of fuel cell that uses a solid oxide or ceramic as the electrolyte of a cell. SOFCs are also known as high temperature fuel cells because the solid phase electrolytes usually do not show acceptable conductivity until they reach a high temperature of 800-1000° C. The solid oxide fuel cell is generally made up of three ceramic layers (hence the name): a porous cathode, a porous anode, and an electrolyte. SOFCs can have a fourth layer, called an interconnect layer, used to stack multiple fuel cells together. Hundreds of the single cells are typically connected in series or parallel to form what most people refer to as an "SOFC stack." A basic SOFC is shown in FIG. 1, which illustrates a single cell on the left and a stack of cells on the right.

One of the important benefits of SOFCs is that SOFC systems can run on fuels other than pure hydrogen gas. This is because the high operating temperatures allow SOFCs to internally reform light hydrocarbons such as methane (natural gas), propane and butane to the $H_2$ and CO needed for the fuel cell reactions. Heavier hydrocarbons including gasoline, diesel, jet fuel and biofuels can also serve as fuels in a SOFC system, but an upstream external reformer is usually required.

Among the many types of fuel cells, the SOFCs represent the cleanest, most efficient, and versatile energy conversion system, offering the prospect of efficient and cost effective utilization of hydrocarbon fuels, coal gas, biomass, and other renewable fuels. However, SOFCs must be economically competitive to be commercially viable and high operating temperatures and expensive materials contribute to cost.

One approach to cost reduction is to drastically reduce the operating temperature from high to intermediate temperatures, usually about 400-700° C., thereby allowing the use of much less expensive materials in the components and improving system longevity. Unfortunately, lowering the operating temperature also lowers the fuel cell performance, as the electrolyte and electrode materials become less conductive and less catalytically active.

Long-term performance of SOFCs also degrades due to poisoning of the cathode by chromium from interconnect layers, deactivation of the conventional anode by carbon deposition, and poisoning by contaminants (e.g., sulfur) in the fuel gas.

Oxygen ion conductors are the conventional conductors for electrolyte use in SOFC (e.g., FIG. 1). However, today both proton and mixed ion conductors are available for SOFC use. The reaction chemistry and examples of oxygen-ion conductors and proton conductors are shown in Table 1:

TABLE 1

| Oxygen ion and proton conductors | | |
|---|---|---|
| Type of conductor | Oxygen ion | Proton |
| Anode reaction | $2H_2 + 2O^{2-} \rightarrow 2H_2O + 4e^-$ / $CO + O^{2-} \rightarrow CO_2 + 2e-$ | $H_2 \rightarrow 2H^+ + 2e^-$ |
| Cathode reaction | $O^2 + 4e^- \rightarrow 2O^{2-}$ | $2H^+ + 2e^- + 1/2\, O_2 \rightarrow H_2O$ |
| Overall reaction | $2H_2 + O_2 \rightarrow 2H_2O$ / $2CO + O_2 \rightarrow 2CO_2$ | $2H_2 + O_2 \rightarrow 2H_2O$ |
| Advantages | $H_2O$, $CO_2$ and high temperatures at anode (fuel side) facilitates reforming of hydrocarbon fuels to $H_2$ and CO, or through water-gas shift reaction to produce $H_2$ from CO | No fuel dilution Intermediate operating temperature |
| Disadvantages | High operating temperature degrades system components and adds to cost $H_2O$ formed at anode dilutes fuel in case of pure $H_2$ used | Reforming at anode (fuel side) lost |

TABLE 1-continued

Oxygen ion and proton conductors

| Type of conductor | Oxygen ion | Proton |
|---|---|---|
| Examples | Yttria-stabilized zirconia (YSZ)<br>Samarium doped ceria (SDC)<br>Gadolinium doped ceria (GDC)<br>Scandia stabilized zirconia (ScSZ)<br>Strontium and magnesium doped lanthanum gallate (LSGM) | Yttria-doped $BaZrO_3$ (BYZ)<br>Calcium-doped lanthanum niobate (LCaNb)<br>Samarium-doped $BaCeO_3$ (BCS)<br>Barium-zirconium-cerium-yttrium (BZCY)<br>Barium-zirconium-cerium-yttrium-ytterbium (BZCYYb) |

As is well known, the advantages of SOFCs based on oxygen ion conductors include the formation of $H_2O$ and $CO_2$ on the fuel side of the cell, which facilitates the use of carbon containing fuels through steam ($H_2O$) and dry ($CO_2$) reforming and water-gas shift reactions. However, the reaction products (e.g. $H_2O$) also dilute the fuel. Further, the high operating temperatures of most oxygen ion conductors adds to cost and degrades system components.

The most important advantages of proton conducting solid oxide fuel cells (PC-SOFCs) compared to conventional oxygen type SOFCs rest on their fundamentally different working principles. In PC-SOFCs, protons migrate through the electrolyte from the anode to the cathode, and react with oxygen to form water. Because water forms at the cathode (not at the anode as for a conventional SOFC), dilution of the fuel at the anode is avoided and the anode environment remains reducing and independent of the fuel cell load. Absence of fuel dilution and the possibility to operate under higher loads without jeopardizing the anode yield potentially higher efficiency and maximum power for PC-SOFCs. However, direct utilization of carbon-containing fuels is no longer possible with proton-conducting electrolytes because the reforming reactions at the anode are no longer possible.

A third option is to tailor the proton and oxygen ion transference number of the mixed ion conductor, allowing $CO_2$ to form on the fuel side while allowing most of the $H_2O$ to form on the air side. The class of mixed proton and oxygen ion conductors holds great potential for a new generation of low temperature SOFCs. However, to date, the ideal mixed ionic conductor has not been found.

Thus, in order to make SOFCs fully fuel-flexible and cost-effective power systems, the issues of anode tolerance to coking and sulfur poisoning, slow ionic conduction in the electrolyte and sluggish kinetics at the cathode need to be addressed. In a broader scientific context, the chemical and electrochemical mechanisms that lead to both of these issues and the phenomena that could prevent them should be investigated in order to best optimize the materials and microstructure of SOFCs for excellent performance and stability.

One attempt to make an ideal SOFC is in U.S. Pat. No. 7,749,626, which discloses an electrical current generating system comprising two stacks of SOFCs so that the gas exhaust and waste heat discharged from the first stack of SOFCs can be recycled and reused by the second stack of SOFCs and/or the reformer that reforms the fuel to hydrogen gas and/or carbon monoxide. The second stack can be a polymer electrolyte fuel cell stack or a phosphoric acid fuel cell stack. However, this patent focuses on the monitoring the exhaust content and power output, and modulating the gas content to be fed to the second stack of SOFC so as to control the power output. The patent teaches only the use of SOFC-O (e.g., col. 14, lines 39-41, "Oxygen ions produced at the cathode 56 move in the solid oxide electrolyte 55 of stabilized zirconia (YSZ or the like) and reach the anode 54"), without any teaching of the use of SOFC-H. In addition, U.S. Pat. No. 7,749,626 requires an additional reformer to reform the exhaust gas and additional fuel before they are supplied to the second stack of SOFC, which will increase operational cost to the SOFCs. Further, combining two SOFC-O cells together is not the most thermodynamically efficient way for SOFC operation because the second stack of SOFC-O cells also requires high operating temperature to achieve better ionic conductivity and overall efficiency.

Therefore, what is needed in the art are better SOFC fuel cells that can use methane as a fuel source and that are cost effective, efficient and long lasting.

SUMMARY OF THE INVENTION

The novel concept in this invention is to combine the two fundamentally different systems, SOFC-O and SOFC-H, together to build a new generation of low temperature SOFCs powered by natural gas. As shown in FIG. 3, the new system includes e.g., two cell stacks: cell stack A are cells based on SOFC-O, which will pump $O^{2-}$ from the cathode to the anode and partially oxidize natural gas to form $H_2O$ and $CO_2$ with electricity. Then the exhaust gases, with the additional natural gas, are fed into stack B for further on-site reforming and production of electricity. High performance and high fuel utilization can be achieved using the combined system.

The configuration of SOFC-O and SOFC-H cells are not limited, as long as the exhaust gas from one SOFC-O cell can be fed to the anode of another SOFC-H. In one embodiment, alternating SOFC-O cells and the SOFC-H cells stack on top of each other. In another embodiment, SOFC-O cells and SOFC-H cells each have their own stack and they are connected in such a way that the exhaust gas from the SOFC-O cells are fed to the SOFC-H cells. Thus, the cells can alternate, or the stacks can alternate, as desired. However, alternating stacks may be the preferred configuration as it is currently easier to manufacture complete stacks of one type or the other.

In more detail, the invention is described in various embodiments, one of which as an electric current generating system, comprising a first solid oxide fuel cell having a first anode, a first cathode, a first solid electrolyte, and a first exhaust outlet, wherein a first fuel is supplied to the first solid oxide fuel cell through a first fuel inlet, and wherein the first solid oxide fuel cell is a oxygen ionic type solid oxide fuel cell and generates a first gas exhaust to said first exhaust outlet; a second solid oxide fuel cell having a second anode, a second cathode, a second solid electrolyte, and a second fuel inlet, and wherein the second solid oxide fuel cell is a proton type solid oxide fuel cell; wherein the second solid oxide fuel cell is connected downstream of the first solid oxide fuel cell so that said first exhaust outlet fluidly connects to said second fuel inlet to allow the second solid oxide fuel cell to use $CO_2$ and steam reforming and water-gas shift reaction said first gas exhaust; wherein said first and second solid oxide fuel cells produce electricity.

Preferably, the first cathode, first anode and first electrolyte are YSZ based, and the second cathode, second anode and second electrolyte are BZCYYb based. In other embodiments, the first cathode is made of LSM-YSZ, the first anode is made of Ni-YSZ, and the first solid electrolyte is made of YSZ, the second cathode is made of LSCF-BZCYYb, the second anode is made of Ni-BZCYYb, and the second solid electrolyte is made of BZCYYb. Alternatively, the first cathode is made of LSM-YSZ, the first anode is made of Ni-YSZ, and the first solid electrolyte is made of YSZ, and the second cathode is made of LSCF-BZCYYb, the second anode is made of Ni-BZCYYb, and the second solid electrolyte is made of BZCYYb.

In another embodiment, the invention is an improved solid oxide fuel cell (SOFC) system, wherein solid oxide fuels cells generally comprise an SOFC stack comprising a plurality of cells, each of said cells comprising an anode layer adjacent an electrolyte layer adjacent a cathode layer adjacent an interconnect layer, the improvement comprising placing a stack of oxygen-type electrolyte solid oxide fuel cells (SOFC-O) upstream of a stack of proton-type electrolyte solid oxide fuel cells (SOFC-H), such that the exhaust of said SOFC-O stack comprises at least part of the fuel for said SOFC-H, and wherein the upstream SOFC-O stack steam reforms $CH_4$ and wherein the downstream SOFC-H stack $CO_2$ reforms $CH_4$.

Another embodiment is a solid oxide fuel cell system, wherein an oxygen-type electrolyte solid oxide fuel cell (SOFC-O) is placed upstream of a proton-type electrolyte solid oxide fuel cell (SOFC-H), such that an exhaust gas of said SOFC-O comprises at least part of a fuel for said SOFC-H.

Another embodiment is a solid oxide fuel cell system, wherein a stack of oxygen-type electrolyte solid oxide fuel cells (SOFC-O) is placed upstream of a stack of proton-type electrolyte solid oxide fuel cell (SOFC-H), such that an inlet fuel comprising $CH_4$ is fed to said SOFC-O and electrochemically oxidized to an exhaust gas comprising $H_2O$, $CO_2$, $CO$, $H_2$, and unreformed $CH_4$. Preferably, said exhaust gas plus optionally more fuel comprising $CH_4$ is fed into said SOFC-H stack and $H_2O$ and $CO_2$ reformed to $H_2$ and $CO$, and $CO$ is further converted to $H_2$ through water-gas shift reaction, and the SOFC-H stack does not need an additional $H_2O$ supply for reforming. Preferably, the exhaust gas of said SOFC-O stack is monitored for content and $CH_4$ is added to said exhaust gas as needed to bring a $H_2O/CH_4$ ratio to 2-2.3:1, or more preferred to 2:1.

The following abbreviations are used herein:

| | |
|---|---|
| SOFC | Solid oxide fuel cell |
| YSZ | Yttria-stablized zirconia |
| LSM | $La_{1-x}Sr_xMnO_{3-\delta}$ |
| BZCYYb | $BaZr_{1-x-y-z}Ce_xY_yYb_zO_{3-\delta}$ |
| LSCF | $La_{1-x}Sr_xCo_{1-y}Fe_yO_{3-\delta}$ |
| LSGM | $La_{1-x}Sr_xGa_{1-y}Mg_yO_{3-\delta}$ |
| SDC | Samarium-doped ceria |
| GDC | Gadolinium-doped ceria |
| BZCY | $BaZr_{1-x-y}Ce_xY_yO_{3-\delta}$ |
| SOFC-O | Oxygen ion type SOFC |
| SOFC-H | Proton type SOFC, aka PC-SOFC |
| OCV | Open circuit voltage |
| ESB | Erbia stabilized bismuth oxide |
| BCS | Sm-doped $BaCeO_3$ |
| BYS | Barium-yttrium-stannate |
| BYZ | Y-doped $BaZrO_3$ |
| LCaNb | Calcium-doped lanthanum niobate |
| ScSZ | Scandia stabilized zirconia |
| SSC | $Sm_{1-x}Sr_xCoO_3$ |

X, y z are doping levels: from 0 to 1, where 0 is no doping and 1 is 100% doping, Delta is the oxygen ion deficit.

As used herein, "reformer" is defined as a device or apparatus for reforming hydrocarbon fuels into hydrogen and byproducts for later use as the fuel for a solid oxide fuel cell. A reformer can be a device independent of the SOFC or can be integrated into the SOFC at the anode side.

As used herein, "on-site reformation" refers to the reformation of fuel to produce $H_2$ and byproducts at the surface of the anode of the SOFC, without using an independent or separate reformer.

As used herein, "SOFC-O" refers to solid oxide fuel cells wherein the electrolytes allow oxygen ions ($O^{2-}$) to diffuse from cathode to anode during the SOFC's operation. As used herein, "SOFC-H" refers to solid oxide fuel cells wherein the electrolytes allow protons ($H^+$) to diffuse from anode to cathode during the SOFC's operation. Mixed-ion electrolytes are expressly excluded from the definitions of SOFC-O and SOFC-H.

By "steam reforming," we mean the conversion of hydrocarbons and water to $H_2$ and byproducts. For methane, the prevalent reaction is: $CH_4+H_2O \rightarrow CO+3H_2$ By "$CO_2$ reforming," we mean the conversion of hydrocarbons and $CO_2$ to $H_2$ and byproducts. For methane, the prevalent reaction is: $CH_4+CO_2 \rightarrow 2CO+2H_2$ By "water-gas shift reaction," we mean the conversion of $CO$ and $H_2O$ to $H_2$ and $CO_2$. The majority reaction is: $CO+H_2O \rightarrow CO_2+H_2$ By defining any word, we include the various grammatical forms thereof.

Any reforming catalyst can be used, if desired, including mixtures of carbonaceous material and metal catalysts. Various metals, such as Cu, Fe, Co, Ni, Ru, Rh, Pd, Ir or Pt over different supports ($Al_2O_3$, $SiO_2$, $TiO_2$, MgO, C, ZnO, SiC, $La_2O_3$, $ZrO_2$, $CeO_2$ or zeolites) are known to allow catalytic reforming reactions, and Ni on BZCYYb is preferred as the Ni is low cost and the BZCYYb support has good conductive properties. However, noble metals may ultimately be preferred as not being susceptible to carbon deposit poisoning, although carbon catalysis may be preferred as being low cost, having high temperature resistance and being resistant to sulphur poisoning. Anode materials by themselves can also provide some amount of catalytic activity, although many anodes are also combined with nickel.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise," "have," "include," and "contain" (and their variants) are open-ended linking verbs and allow the addition of other elements when used in a claim. The phrase "consisting of" excludes other elements from the claim, and the phrase "consisting essentially of" excludes material elements, but non-material elements that do not change the way an invention functions, such as labels, instructions, and the like, can be added thereto.

DESCRIPTION OF EMBODIMENTS OF THE INVENTION

Figure 1:
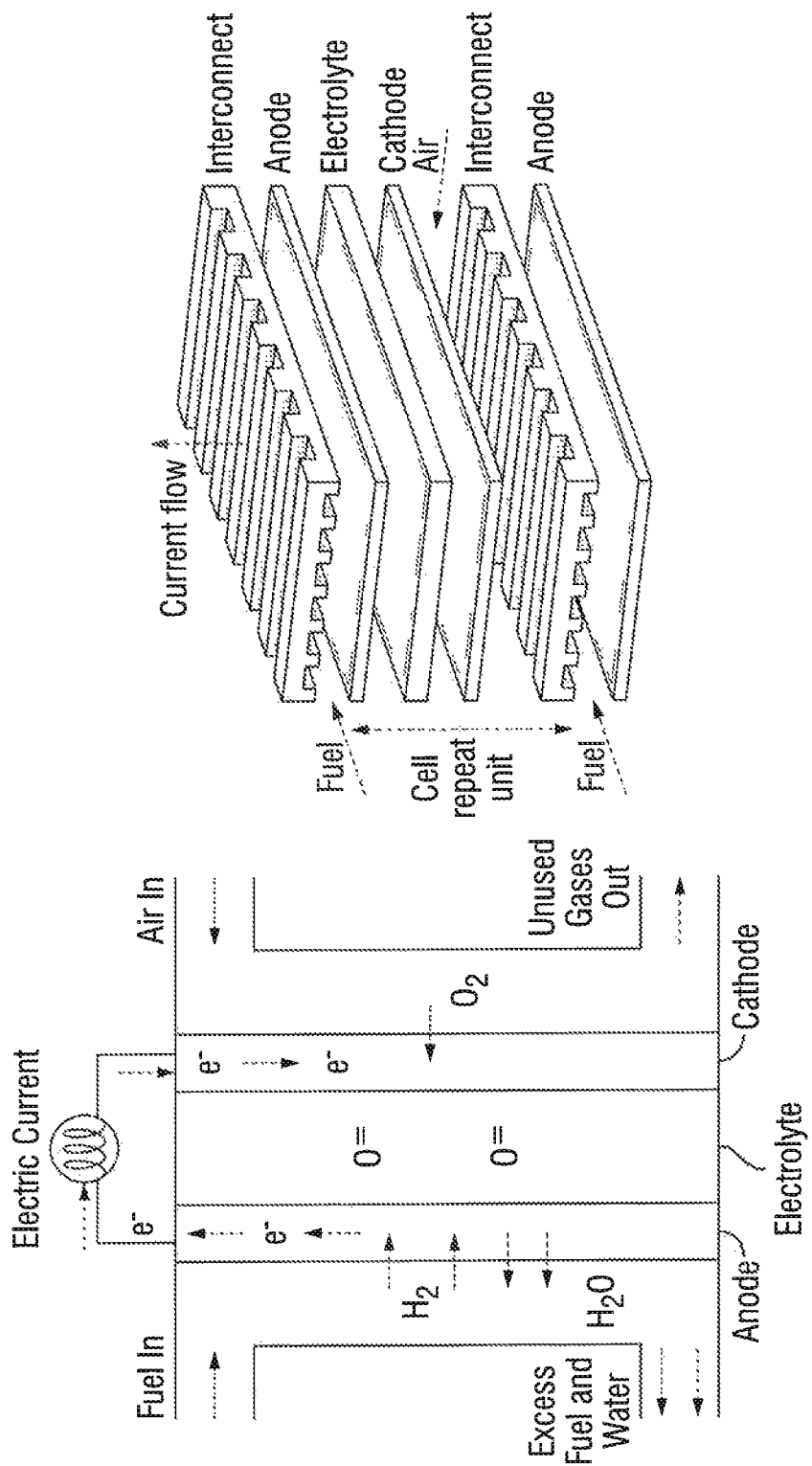
FIG. 1 shows the basic design of a single cell for a solid oxide fuel cell (left) as well as a multilayer stack (right).
Figure 2:
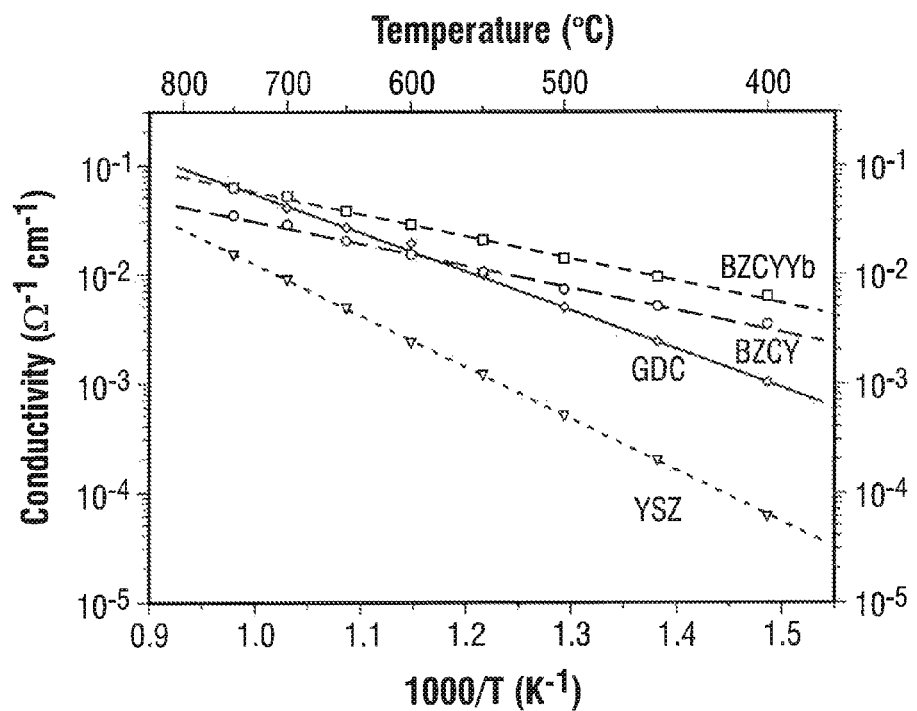
FIG. 2 shows the ion conductivity of different electrolytes measured at different temperatures, and illustrates the improved conductivity of SOFC-H based cells.
Figure 3:
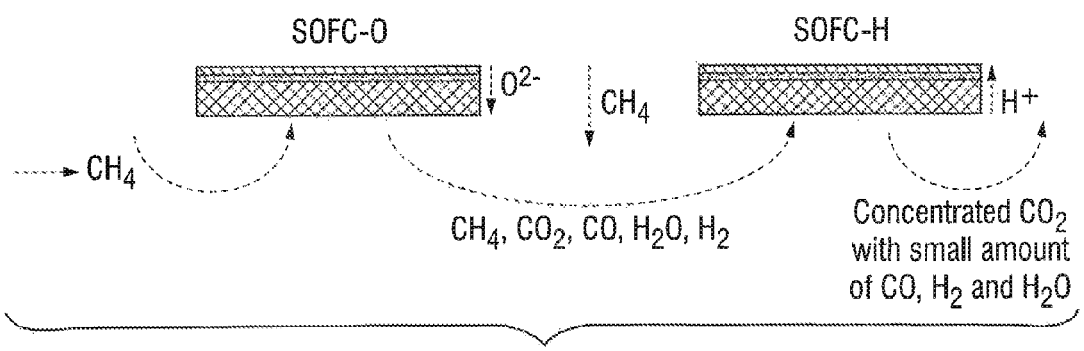
FIG. 3 is a schematic figure showing the concept of combining SOFC-O with SOFC-H cells.

The invention provides a novel integrated SOFC system that generates power based on using natural gas as the fuel. More specifically, the present invention provides an integrated SOFC system that combines an SOFC-O stack with an SOFC-H stack so as to take advantage of the high operating temperature of the SOFC-O stack by recycling the heat in the reforming process and recycling the exhaust gas from the SOFC-O stack. Both of these features greatly improve the efficiency and cost effectiveness of the battery.

More particularly, the upstream SOFC-O stack will run at temperatures high enough to electrochemically oxidize the hydrocarbon fuel to generate electricity with the byproduct of $CO_2$ and $H_2O$. Further, the high temperatures of the exhaust and its high $CO_2$ and $H_2O$ content will allow $H_2O$ and $CO_2$ reforming of hydrocarbon fuels as well as water-gas shift reaction to produce $H_2$ at the downstream SOFC-H stack. The SOFC-H oxidizes the $H_2$ to generate electricity. Yet, the downstream SOFC-H stack still provides the high efficiencies attributable to proton based electrolyte stacks. In this way, the advantages of both systems are realized. Thus, the reforming of $CH_4$ to $H_2$ is maximized, yet the efficiencies of the intermediate temperature SOFC-H stack are also obtained.

An additional advantage of the present invention lies in that SOFC-H cells produce concentrated $CO_2$ from the reforming process and water-gas shift reaction at the anode side and water at the cathode side, thus, making it very cost-effective to capture the $CO_2$ so as to reduce the $CO_2$ emission associated with SOFCs The configuration between the SOFC-O stack and the SOFC-H stack is not limited, as long as the gas exhaust from the SOFC-O cells is fed into the SOFC-H cells, thus providing at least part of the fuel for the SOFC-H cells.

In one embodiment, single SOFC-O cells and single SOFC-H cells stack on top of each other in an alternating fashion. In this configuration, the gas exhaust from the SOFC-O cells is supplied to the adjacent SOFC-H cells. In another embodiment, SOFC-O cells form a single stack, and SOFC-H cells form a separate stack. The gas exhaust generated by the SOFC-O cells is collectively transferred to the SOFC-H cells as part of the fuel. This embodiment may be preferred as easier to manufacture than alternating cells.

In one embodiment, there is a single SOFC-O stack upstream of a single SOFC-H stack. In other embodiments, the alternating arrangement is repeated, for example, (SOFC-O→SOFC-H)$_n$, wherein n≥1, and the arrow indicates that the SOFC-O stack is upstream of the SOFC-H stack.

In another embodiment, additional fuel may be added to the exhaust gas before entering the downstream SOFC-H stack, thus allowing some additional reforming and further improving efficiencies.

In another embodiment, the content of exhaust gas is monitored, and the amount of added fuel is based on the content of the exhaust gas.

Suitable fuels for on-site reforming include $C_1$-$C_4$ hydrocarbons, such as methane, ethane, propane and butane, or even liquid fuels, such as methanol, ethanol, and gasoline. But a preferred abundant and inexpensive fuel is $CH_4$ (aka methane or natural gas).

In preferred embodiments, the fuel is mostly $CH_4$, although other lightweight hydrocarbons can be added thereto. Ideally, the incoming $CH_4$ for the second stack is maintained at about 1:2 ratio with the exhaust $H_2O$ levels, but in other embodiments, $H_2O/CH_4$ ratios higher than unity can be used to avoid carbon deposition. Thus, the fuel can be added to the exhaust gas to provide a 2-2.3:1 ratio of $H_2O/CH_4$.

The materials for the anode, cathode and O-type or H type electrolyte can be chosen from any of the known or future developed materials, provided that they are compatible with each other and provide maximum longevity and efficiencies balanced against cost.

Cathode materials must be, at minimum, electronically conductive and porous. Currently, lanthanum strontium manganite (LSM) is currently the cathode material of choice for commercial use because of its compatibility with doped zirconia electrolytes. Composite cathodes, such LSM-YSZ can also be used, or mixed ionic/electronic conducting (MIEC) ceramics, such as the perovskite LSCF.

Preferred cathode materials for the SOFC-O include LSM-YSZ or LSCF-SDC with SDC barrier layer, or SSC-SDC with SDC barrier layer, whereas preferred cathode materials for the SOFC-H include LSCF-BZCYYb or SSC-BZCYYb.

Preferred electrolyte materials for the SOFC-O include yttria-stabilized zirconia (YSZ) (often the 8% form Y8SZ), scandia stabilized zirconia (ScSZ) (usually 9 mol % Sc2O3-9ScSZ) and gadolinium doped ceria (GDC) or SDC. Preferred electrolyte materials for the SOFC-H include BZCYYb or BZCY.

Preferred anode materials must be very porous to allow the fuel to flow towards the electrolyte. Like the cathode, it must conduct electrons, with ionic conductivity a definite asset. Preferred anode materials for the SOFC-O include Ni-YSZ or Ni-SDC and preferred anode materials for the SOFC-H include Ni-BZCYYb or Ni-BZCY.

The interconnect can be either a metallic or ceramic layer that sits between each individual cell and is shaped to allow gas flow therethrough, as well as to provide electrical contact between cells. Because the interconnect is exposed to both the oxidizing and reducing side of the cell at high temperatures, it must be extremely stable. For this reason, ceramics have been more successful in the long term than metals as interconnect materials. However, these ceramic interconnect materials are very expensive as compared to metals, and nickel- and steel-based alloys are becoming more promising as lower temperature SOFCs are developed.

The preferred interconnect in contact with Y8SZ is a metallic 95Cr-5Fe alloy or La(Ca)CrO$_3$. However, ceramic-metal composites called 'cermet' can also be used, as they have demonstrated thermal stability at high temperatures and excellent electrical conductivity. Preferred interconnect materials for the SOFC-H stacks include nickel based alloys and the like.

The shape of the fuel cell can be any shape available, although planar stacks and tubes are most common.

The following discussions are illustrative only, and are not intended to unduly limit the scope of the invention.

Measuring Content of Exhaust Gas From SOFC-O

The SOFC-O stack exemplified herein has Ni-YSZ as the anode, LSM-YSZ or LSCF-SDC with SDC barrier layer as the cathode, and YSZ (yttria-stabilized zirconia) as the electrolyte. To effectively build an integrated two-stack SOFC in which the exhaust gas from the first stack is to be recycled by the second stack, the content of the exhaust gas from the first stack must be determined first. The operating temperature and the amount of exhaust gas should also be established. The exhaust gas in this exemplary SOFC-O has the following composition: water (~50% v/v), carbon dioxide (~25% v/v), CO and $H_2$ (~15% v/v) and unreacted methane (~10% v/v), and temperatures of about 450-750° C.

The second stack used herein is a SOFC-H stack that has Ni-BZCYYb as anode, LSCF-BZCYYb as cathode, and BZCYYb as electrolyte. As determined above, the exhaust from the first stack is dominated by water (~50% v/v), with some carbon dioxide (~25% v/v) and small amounts of remaining unreformed methane (~10% v/v) with a total of about 90% efficiency for the partial oxidation. Based on the theoretical operating temperature of the second stack being 450-650° C., it is calculated that additional fuel enriched in methane is necessary to take the advantage of $H_2O:CH_4$ (~2:1) reforming according to the following reactions:

$$CH_4 + CO_2 \rightarrow 2CO + 2H_2$$

$$CH_4 + H_2O \rightarrow CO + 3H_2$$

$$CO + H_2O \rightarrow CO_2 + H_2$$

Therefore, a little more $CH_4$ should be added to the fuel as it enters the second SOFC-H stack, and when combined with the high temperature exhaust gas from the SOFC-O stack and the Ni catalysts, $CO_2$/steam reforming and water-gas shift reaction will now occur. Ideally, the $CH_4$ is brought to about 30% or less in our example above, but the percentage can range from 10 to 30%, depending on the amount of $H_2O$ produced by the first stack, so as to maintain a 2:1 or slightly higher ratio of $H_2O$ to $CH_4$.

Integration of SOFC-O And SOFC-H

Figure 4:
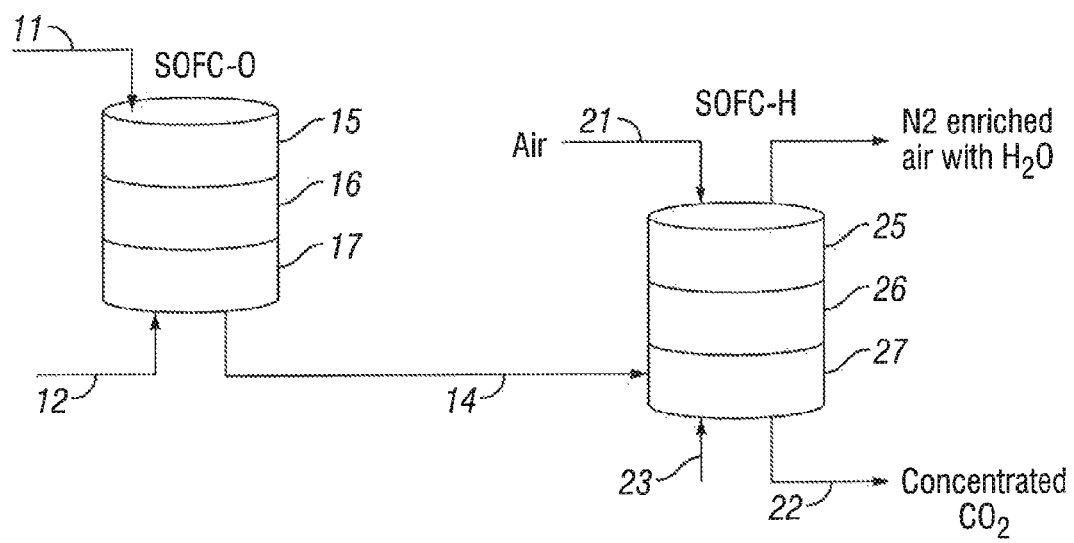
FIG. 4 is a schematic figure showing the actual configuration of the integrated system according to one embodiment of the present invention.
Figure 5:
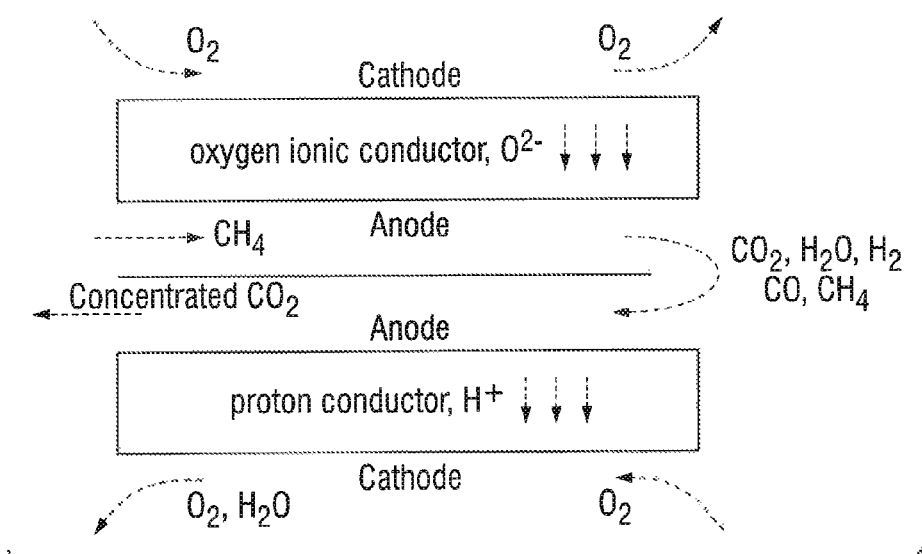
FIG. 5 is a schematic figure showing one embodiment of the present invention in which one SOFC-O cell is stack on a SOFC-H cell in an alternating fashion.

An integrated system of two-stack SOFC that includes SOFC-O and SOFC-H is shown in FIG. 4. As shown in FIG. 4, a SOFC-O stack is simplified to comprise a cathode 15, an anode 17, with an oxygen ion type electrolyte 16 interposed between the cathode 15 and anode 17. It is to be understood that a SOFC stack actually comprises multiple cells connected to each other by interconnects (not shown).

Air 11 is supplied to the cathode 15, while fuel 12 is supplied to the anode 17. As explained above, in a SOFC-O cell, the oxidation of fuel takes place at the anode 17, while the reduction of oxygen takes place at the cathode 15. The fuel 12 may comprise hydrocarbon fuels, such as methane, and/or other suitable fuels. After the oxidation reaction, exhaust gas 14 may comprise mostly $H_2O$ and $CO_2$, with some unused methane, and other byproducts such as CO, $H_2$, though $H_2O$ and $CO_2$ is the main product.

A second stack, made of SOFC-H cells, is provided. This stack is also simplified in the figure to comprise a cathode 25, a proton type electrolyte 26 and an anode 27. The SOFC-H differs from SOFC-O in that proton becomes the charge carrier to diffuse from anode 27 through the electrolyte 26 to the cathode 25. As a result, the water is produced at the cathode 25, thus not diluting the fuel at the anode as at an SOFC-O's anode.

Exhaust gas 14 from the SOFC-O is then fed to the anode 27 of the second stack of SOFC-H cells. Additional fuel 23 can also be supplied to the anode 27 of the second stack. The heat of the exhaust gas and concentrated $H_2O$ and $CO_2$ of the exhaust gas can be used to reform the remaining $CH_4$ plus any additional fuel and perform water-gas shift reaction to produce $H_2$ for the SOFC-H cell. It is to be noted that no separate reformer is required between the first SOFC-O stack and the second SOFC-H stack, because the reforming process can be carried out on-site on the anode surface of the SOFC-H stack, although separate reformers may be needed for higher weight hydrocarbons and can be added as desired.

A SOFC-H cell typically uses ceramic electrolytes that benefit at higher temperature to have theoretically 80% conversion rate, whereas at lower temperature (400-750° C.) still maintain high enough conductivity due to its lower activation enthalpy of ion conductivity. Additionally, the current density of presently developed SOFC-H can be as high as 95% of theoretical value. As discussed above, an SOFC-O inherently requires higher operating temperature, which is not only necessary to maintain higher ionic conductivity of the electrolyte, but also to facilitate the electrochemical oxidation of the hydrocarbon fuels. Therefore, the combination of SOFC-O and SOFC-H provides the advantage of both systems, providing better heat recycling and conversion rate.

The content of exhaust gas 14 from SOFC-O can be monitored by sensors, such that the dominant gases are water (~50% v/v), carbon dioxide (~25% v/v), CO and $H_2$ (~10% v/v) and methane (~10%), and the calculation of fuel intake in SOFC-H is based on such composition. This composition, however, is subject to dynamic change within the SOFC-O. Therefore, preferably a content-monitor 30 is provided in the exhaust gas outlet 14 of SOFC-O stack to monitor the content of the exhaust 14. When the $H_2O$ level is much higher than the unreformed $CH_4$ level, extra fuel is supplemented through the additional fuel inlet 23 in order to allow $H_2O$ reforming at the SOFC-H anode.

Additionally, the amount of additional fuel can also be determined by the operating temperature and output power density of the SOFC-H, which is monitored and can be be dynamically changing. If the operating temperature and/or output power density are too low, more additional fuel is supplied to the SOFC-H stack. On the other hand, if the operating temperature and/or the output power density are too high, then less additional fuel is supplied to the SOFC-H stack.

The overall electrochemical conversion efficiency of this integrated system is up to 85%, comparing to a traditional SOFC-O that has typical conversion efficiency of 50%. Further, the integrated system allows use of hydrocarbon fuels by reforming processes. Therefore, the integrated system of the present invention shows significantly higher energy conversion efficiency and is available for use with methane and other light hydrocarbons.

The following references are incorporated by reference in their entirety.

1. Yang, L., S. Z. Wang, K. Blinn, M. F. Liu, Z. Liu, Z. Cheng, and M. L. Liu, *Enhanced Sulfur and Coking Tolerance of a*

*Mixed Ion Conductor for SOFCs: BaZr0.1Ce0.7Y0.2-xYbxO3-delta.* Science, 2009. 326(5949): p. 126-129.
2. Atkinson, A., S. Barnett, R. J. Gorte, J. T. S. Irvine, A. J. Mcevoy, M. Mogensen, S. C. Singhal, and J. Vohs, *Advanced anodes for high-temperature fuel cells.* Nature Materials, 2004. 3(1): p. 17-27.
3. Steele, B. C. H., *Fuel-cell technology—Running on natural gas.* Nature, 1999. 400(6745): p. 619-+.
4. Park, S. D., J. M. Vohs, and R. J. Gorte, *Direct oxidation of hydrocarbons in a solid-oxide fuel cell.* Nature, 2000. 404 (6775): p. 265-267.
5. Xia, C. R., W. Rauch, F. L. Chen, and M. L. Liu, *Sm0.5Sr0.5CoO3 cathodes for low-temperature SOFCs.* Solid State Ionics, 2002. 149(1-2): p. 11-19.
6. deSouza, S., S. J. Visco, and L. C. DeJonghe, *Thin-film solid oxide fuel cell with high performance at low-temperature.* Solid State Ionics, 1997. 98(1-2): p. 57-61.
7. Singhal, S. C., *Advances in solid oxide fuel cell technology.* Solid State Ionics, 2000. 135(1-4): p. 305-313.
8. Steele, B. C. H. and A. Heinzel, *Materials for fuel-cell technologies.* Nature, 2001. 414(6861): p. 345-352.
9. Jiang, S. P. and W. Wang, *Novel structured mixed ionic and electronic conducting cathodes of solid oxide fuel cells.* Solid State Ionics, 2005. 176(15-16): p. 1351-1357.
10. Kim, J. Y., V. L. Sprenkle, N. L. Canfield, K. D. Meinhardt, and L. A. Chick, *Effects of chrome contamination on the performance of La0.6Sr0.4Co0.2Fe0.8O3 cathode used in solid oxide fuel cells.* Journal of the Electrochemical Society, 2006. 153(5): p. A880-A886.
11. Demin, A. K., P. E. Tsiakaras, V. A. Sobyanin, and S. Y. Hramova, *Thermodynamic analysis of a methane fed SOFC system based on a protonic conductor.* Solid State Ionics, 2002. 152: p. 555-560.
12. Liu, M., et al., Rational SOFC material design: new advances and tools, Materials Today 14(11): 534-546 (2011).
13. U.S. Pat. No. 7,749,626

What is claimed is:

1. A dual stack-type electric current generating system, comprising:
   a) a first stack-type solid oxide fuel cell having a first anode, a first cathode, a first solid electrolyte, and a first exhaust outlet; wherein the first cathode, the first anode and the first solid electrolyte are YSZ based, wherein a first fuel is supplied to the first stack-type solid oxide fuel cell through a first fuel inlet, and wherein the first stack-type solid oxide fuel cell is an oxygen ionic type solid oxide fuel cell;
   b) a second stack-type solid oxide fuel cell having a second anode, a second cathode, a second solid electrolyte, and a second fuel inlet; wherein the second cathode, the second anode and the second solid electrolyte are BZCYYb based and wherein the second stack-type solid oxide fuel cell is a proton type solid oxide fuel cell;
   c) wherein the second stack-type solid oxide fuel cell is connected downstream of the first stack-type solid oxide fuel cell, such that a first exhaust outlet fluidly connects to a second fuel inlet to allow the second stack-type solid oxide fuel cell to use $CO_2$ and steam reforming and water-gas shift reaction from the first gas exhaust;
   d) wherein a second fuel containing methane or natural gas is supplied to the second stack-type oxide fuel cell through the second fuel inlet or optionally a third fuel inlet;
   e) wherein the first and second stack-type solid oxide fuel cells produce electricity; and
   f) wherein the conversion efficiency of the dual stack-type electric current generating system is between about 50% and about 85%.

2. The dual stack-type electric current generating system of claim 1, wherein the first fuel is selected from the group consisting of methane, ethane, propane, butane, natural gas, methanol, ethanol, gasoline and combinations thereof and the second fuel is selected from the group consisting of methane and natural gas.

3. The dual stack-type electric current generating system of claim 1, wherein the first cathode is made of LSMYSZ, the first anode is made of Ni-YSZ, and the first solid electrolyte is made of YSZ.

4. The dual stack-type electric current generating system of claim 1, wherein the second cathode is made of LSCF-BZCYYb, the second anode is made of Ni-BZCYYb, and the second solid electrolyte is made of BZCYYb.

5. The dual stack-type electric current generating system of claim 1, wherein the first cathode is made of LSMYSZ, the first anode is made of Ni-YSZ, and the first solid electrolyte is made of YSZ, and wherein the second cathode is made of LSCF-BZCYYb, the second anode is made of NiBZCYYb, and the second solid electrolyte is made of BZCYYb.

6. The dual stack-type electric current generating system of claim 1, wherein the second fuel and the first exhaust gas are supplied to the second fuel inlet.

7. The dual stack-type electric current generating system of claim 6, wherein the second stack-type solid oxide fuel cell $CO_2$ and water reforms the second fuel and perform water-gas shift reaction on the surface of the second anode to produce $H_2$.

8. The dual stack-type electric current generating system of claim 7, wherein the second stack-type solid oxide fuel cell produces concentrated $CO_2$ as a by-product at the second anode.

9. The dual stack-type electric current generating system of claim 8, wherein the concentrated $CO_2$ by-product is captured to reduce $CO_2$ emission of the dual stack-type electric current generating system.

10. A dual stack-type solid oxide fuel cell (SOFC) system comprising:
    a) a stack of oxygen-type solid oxide fuel cells (SOFC-O) comprising a plurality of SOFC-O cells, each of the SOFC-O cells comprising a SOFC-O anode layer adjacent a SOFC-O electrolyte layer adjacent a SOFC-O cathode layer adjacent a SOFC-O interconnect layer, wherein at least one of the SOFC-O anode layer, the SOFC-O electrolyte layer and the SOFC-O cathode layer is YSZ-based;
    b) a stack of proton-type solid oxide fuel cells (SOFC-H) comprising a plurality of SOFC-H cells, each of the SOFC-H cells comprising a SOFC-H anode layer adjacent to a SOFC-H electrolyte layer adjacent to a SOFC-H cathode layer adjacent to a SOFC-H interconnect layer, wherein at least one of the SOFC-H anode layer, the SOFC-H electrolyte layer and the SOFC-H cathode layer is BZCYYb based;
    c) wherein the stack of SOFC-O cells is placed upstream of the stack of SOFC-H cells, such that an exhaust of the stack of SOFC-O cells comprises at least part of a fuel for the stack of SOFC-H cells;
    d) wherein the upstream stack of SOFC-O cells steam reforms $CH_4$ and;
    e) wherein the downstream stack of SOFC-H cells $CO_2$ reforms $CH_4$.

11. A dual stack-type solid oxide fuel cell (SOFC) system, comprising a stack of oxygen-type electrolyte solid oxide fuel cells (SOFC-O) is placed upstream of a stack of proton-type electrolyte solid oxide fuel cells (SOFC-H), such that an exhaust gas of the stack of SOFC-O cells comprises at least part of a fuel for the stack of SOFC-H cells, wherein at least one of a SOFC-O anode, a SOFC-O electrolyte and a SOFC-O cathode is YSZ based and at least one of a SOFC-H anode, a SOFC-H electrolyte and a SOFC-H cathode is BZCYYb based.

12. The dual stack-type solid oxide fuel cell (SOFC) system of claim 10, wherein a fuel for the stack of SOFC-O cells comprises $CH_4$.

13. The dual stack-type solid oxide fuel cell (SOFC) system of claim 11, wherein a fuel for the stack of SOFC-H cells comprises added $CH_4$ and an exhaust gas of the stack of SOFC-O cells.

14. The dual stack-type electric current generating system of claim 1, where the conversion efficiency is about 85%.

15. A dual stack-type solid oxide fuel cell (SOFC) system, comprising:
 a) a stack of oxygen-type electrolyte solid oxide fuel cells (SOFC-O) placed upstream of a stack of proton-type electrolyte solid oxide fuel cells (SOFC-H), such that an inlet fuel comprising $CH_4$ is fed to the stack of SOFC-O cells and electrochemically oxidized to an exhaust gas comprising $H_2O$, $CO_2$, $CO$, $H_2$, and unreformed $CH_4$;
 b) wherein the exhaust gas plus optionally more fuel comprising $CH_4$ is fed into the stack of SOFC-H cells and $H_2O$ and $CO_2$ reformed to $H_2$ and $CO$, and $CO$ is further converted to $H_2$ through water-gas shift reaction;
 c) wherein the stack of SOFC-H cells does not need an additional $H_2O$ supply for reforming;
 d) wherein at least one of a SOFC-O anode, a SOFC-O electrolyte and a SOFC-O cathode is YSZ based and at least one of a SOFC-H anode, a SOFC-H electrolyte and a SOFC-H cathode is BZCYYb based; and
 e) wherein the conversion efficiency of the dual stack-type SOFC is between about 50% and about 85%.

16. The dual stack-type solid oxide fuel cell (SOFC) system of claim 15, wherein the exhaust gas of the stack of SOFC-O cells is monitored for content and wherein $CH_4$ is added to the exhaust gas to bring a $H_2O/CH_4$ ratio to 2-2.3:1.

17. The dual stack-type solid oxide fuel cell (SOFC) system of claim 15, wherein the exhaust gas of the stack of SOFC-O cells is monitored for content and wherein $CH_4$ is added to the exhaust gas to bring a $H_2O/C1$-14 ratio to 2:1.

18. The dual stack-type solid oxide fuel cell (SOFC) system of claim 15, wherein the stack of SOFC-O cells comprises a SOFC-O cathode of LSMYSZ, a SOFC-O anode of Ni-YSZ, and a SOFC-O electrolyte of YSZ.

19. The dual stack-type solid oxide fuel cell (SOFC) system of claim 15, wherein the stack of SOFC-H cells comprises a SOFC-H cathode of LSCF-BZCYYb, a SOFC-H anode of Ni-BZCYYb, and a SOFC-H electrolyte of BZCYYb.

20. The dual stack-type electric current generating system of claim 1, wherein the first exhaust gas are supplied to the second fuel inlet and the second fuel is supplied to the third fuel inlet.

* * * * *

UNITED STATES PATENT AND TRADEMARK OFFICE
CERTIFICATE OF CORRECTION

PATENT NO. : 9,118,052 B2
APPLICATION NO. : 13/608913
DATED : August 25, 2015
INVENTOR(S) : Mingfei Liu, Meilin Liu and Ting He It is certified that error appears in the above-identified patent and that said Letters Patent is hereby corrected as shown below:

Title Page, Item (54) and in the Specification at Column 1, line 2 the last word in the title of the invention misspelled as "SYSTEMS" should be corrected to read -- SYSTEM --.

Title Page, Item (73) the first part of the first Assignee's name misspelled as "Philips" should be corrected to read -- Phillips --.

In the Specification

Column 2, column 2 of Table 1, the Oxygen ion equation for Anode reaction reading $$2H_2 + 2O^{2-} \rightarrow 2H_2O + 4e^-/$$
$$CO + O^{2-} \rightarrow CO_2 + 2e-$$

" should read --
$$2H_2 + 2O^{2-} \rightarrow 2H_2O + 4e^-$$
$$/CO + O^{2-} \rightarrow CO_2 + 2e-$$
--.

Column 2, column 2 of Table 1, the Oxygen ion equation for Overall reaction reading $$2H_2 + O_2 \rightarrow 2H_2O/$$
$$2CO + O_2 \rightarrow 2CO_2$$

" should read --
$$2H_2 + O_2 \rightarrow 2H_2O$$
$$/2CO + O_2 \rightarrow 2CO_2$$
--.

Signed and Sealed this
Sixteenth Day of February, 2016

Michelle K. Lee
*Director of the United States Patent and Trademark Office*